(No Model.)
J. T. RICHARDS.
AXLE LUBRICATOR.
No. 492,697. Patented Feb. 28, 1893.
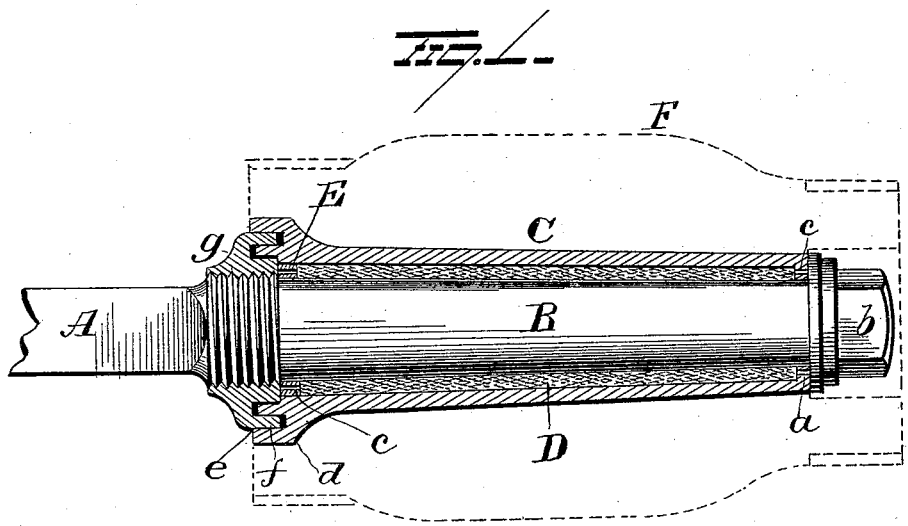
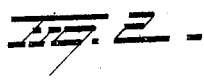
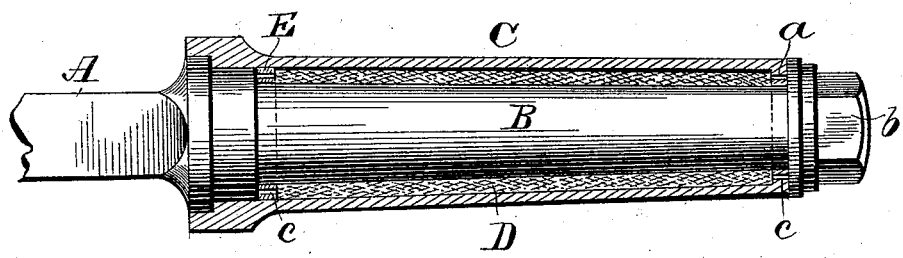
Witnesses
Inventor
John T. Richards
Attorney

UNITED STATES PATENT OFFICE.

JOHN T. RICHARDS, OF GARDINER, MAINE.

AXLE-LUBRICATOR.

SPECIFICATION forming part of Letters Patent No. 492,697, dated February 28, 1893.

Application filed July 13, 1892. Serial No. 439,918. (No model.)

*To all whom it may concern:*

Be it known that I, JOHN T. RICHARDS, residing at Gardiner, in the county of Kennebec and State of Maine, have invented certain new and useful Improvements in Axle-Lubricators; and I do hereby declare the following to be a full, clear, and exact description of the invention, such as will enable others skilled in the art to which it appertains to make and use the same.

My invention relates to an improvement in lubricating devices for axles,—the object of the invention being to produce an axle lubricator which shall be simple in construction and effectual in the performance of its functions.

With this object in view the invention consists in certain novel features of construction and combinations and arrangements of parts as hereinafter set forth and pointed out in the claims.

In the accompanying drawings: Figure 1 is a sectional view illustrating my invention. Fig. 2 is a similar view showing the application of my improvements to an ordinary axle box.

A represents an axle, and B the skein thereon, on which latter an axle box C is located. The axle box C is made at its outer end with an inwardly projecting lip or flange $a$, which serves as a bearing for the outer end of the skein B and is also provided with a chamber D between the skein and the inner face of the axle box C, said axle box being retained in place by means of a nut $b$ screwed on the end of the skein. The inner end of the axle box is maintained in proper relation to the skein by means of a ring or washer E. The chamber D between the skein and axle box is filled with lubricating material of any preferred kind, and the flange or lip $a$ and the ring or washer E may both be provided with perforations $c$ to permit lubricating material to work its way through the ends of the axle box. The inner end of the axle box C is preferably enlarged and adapted to enter a recess $d$ in the end of the hub F, said enlarged portion being made with a groove $e$ for the reception of the flange $f$ of a dust guard $g$ carried by the axle.

In Fig. 2 the invention is shown as applied to an axle box without the enlargement for the accommodation of the dust guard.

A lubricating device constructed and arranged in the manner above described is very simple, and is effectual in the performance of its functions.

Having fully described my invention, what I claim as new, and desire to secure by Letters Patent, is—

1. The combination with an axle box having an inwardly projecting perforated flange at its outer end adapted to bear on the skein or axle and permit some of the lubricating material to find its way outward, of an imperforate nut adapted to screw on the outer end of the axle or skein and close the perforations in the flange, substantially as set forth.

2. An axle box having an inwardly projecting ring or flange at each end adapted to bear upon the axle or skein and form a chamber for lubricating material between the inner wall of the box and the axle or skein, said flanges or rings having perforations therein for the discharge of lubricating material, substantially as set forth.

In testimony whereof I have signed this specification in the presence of two subscribing witnesses.

JOHN T. RICHARDS.

Witnesses:
AMASA E. HARMON,
GEO. W. HESELTON.